(12) United States Patent
Chung

(10) Patent No.: US 12,141,846 B2
(45) Date of Patent: Nov. 12, 2024

(54) ONLINE SHOPPING SUPPORT DEVICE AND METHOD FOR OPERATING ONLINE SHOPPING SUPPORT DEVICE

(71) Applicant: Tae Sung Chung, Seoul (KR)

(72) Inventor: Tae Sung Chung, Seoul (KR)

( * ) Notice: Subject to any disclaimer, the term of this patent is extended or adjusted under 35 U.S.C. 154(b) by 224 days.

(21) Appl. No.: 17/713,383

(22) Filed: Apr. 5, 2022

(65) Prior Publication Data

US 2022/0230212 A1 Jul. 21, 2022

Related U.S. Application Data

(63) Continuation of application No. PCT/KR2020/013134, filed on Sep. 25, 2020.

(30) Foreign Application Priority Data

Oct. 7, 2019 (KR) ........................ 10-2019-0123754

(51) Int. Cl.
*G06Q 30/00* (2023.01)
*G06Q 30/0283* (2023.01)
*G06Q 30/0601* (2023.01)

(52) U.S. Cl.
CPC ..... *G06Q 30/0283* (2013.01); *G06Q 30/0635* (2013.01)

(58) Field of Classification Search
CPC .............................................. G06Q 30/06–08
See application file for complete search history.

(56) References Cited

U.S. PATENT DOCUMENTS

| 2001/0027433 | A1 | 10/2001 | Fujiwara et al. | |
| 2006/0122928 | A1* | 6/2006 | Gram | G06Q 30/08 705/37 |
| 2007/0136179 | A1* | 6/2007 | Nguyen | G06Q 40/03 705/37 |
| 2007/0239550 | A9 | 10/2007 | Batoff | |
| 2009/0164338 | A1* | 6/2009 | Rothman | G06Q 30/0603 705/26.1 |

(Continued)

FOREIGN PATENT DOCUMENTS

| JP | 2001-283043 A | 10/2001 |
| JP | 2002-269381 A | 9/2002 |

(Continued)

OTHER PUBLICATIONS

Machine Translation of KR 10-2013186 downloaded from Espacenet.com (Year: 2019).*

(Continued)

*Primary Examiner* — Ethan D Civan
(74) *Attorney, Agent, or Firm* — Hauptman Ham, LLP

(57) ABSTRACT

The present disclosure relates to an apparatus for supporting online shopping. The apparatus comprises an identification unit configured to identify an online price tag of a specific product embedded into a webpage of an exhibitor, an update unit configured to update a selling price exposed to the online price tag according to a result of a reverse auction between sellers for a selling price of the specific product, and a processing unit configured to, when a purchase intent of a purchaser accessing the webpage of the exhibitor is (Continued)

conventional webpage 1) equal to or less than ₩10,000 , XXXX RP-1XE120 (₩6,000)

(a)

online price tag embedded 1) equal to or less than ₩10,000, XXXX RP-1XE120

₩6,900 online price tag (b)

identified from the online price tag, process a procedure of purchasing the specific product based on the updated selling price.

14 Claims, 4 Drawing Sheets

(56) References Cited

U.S. PATENT DOCUMENTS

| | | | | |
|---|---|---|---|---|
| 2010/0217680 A1* | 8/2010 | Fusz | ............... | G06Q 30/0601 |
| | | | | 705/26.1 |
| 2014/0129370 A1* | 5/2014 | Mabrey | ............... | G06Q 50/01 |
| | | | | 705/26.5 |

FOREIGN PATENT DOCUMENTS

| | | | |
|---|---|---|---|
| JP | 2005-78132 | A | 3/2005 |
| JP | 2015-35110 | A | 2/2015 |
| JP | 2017-97386 | A | 6/2017 |
| KR | 10-2009-0087408 | A | 8/2009 |
| KR | 10-2010-0138050 | A | 12/2010 |
| KR | 10-2011-0087371 | A | 8/2011 |
| KR | 10-2013-0052233 | A | 5/2013 |
| KR | 10-2013186 | B1 | 8/2019 |
| KR | 10-2015024 | B1 | 8/2019 |

OTHER PUBLICATIONS

Julson, E., "XML helps to cut Net data snarls", Electronic Engineering Times: 86, United Business Media LLC, Sep. 4, 2000 (Year: 2000).*

International Search Report dated Jan. 7, 2021 for corresponding International Patent Application No. PCT/KR2020/013134.

Written Opinion dated Jan. 7, 2021 for corresponding International Patent Application No. PCT/KR2020/013134.

Korean Office Action dated Jan. 28, 2021 for corresponding Korean application No. 10-2019-0123754.

Korean Notice of Allowance dated Jul. 6, 2021 for corresponding Korean application No. 10-2019-0123754.

Office Action issued on May 9, 2023, for corresponding Japanese Patent Application No. 2022-520863, along with an English translation (5 pages).

Extended European Search Report issued on Jun. 26, 2023, for corresponding European Patent Application No. 20873999.5 (8 pages).

Japanese Office Action issued on Oct. 3, 2023, in connection with the Japanese Patent Application No. 2022-520863 with its English translation (6 pages).

Japanese Office Action dated Mar. 5, 2024 for corresponding Japanese Patent Application No. 2022-520863, with English machine translation (5 pages).

* cited by examiner conventional webpage 1) equal to or less than ₩10,000 , XXXX RP-1XE120 (₩6,000)

(a)

online price tag embedded 1) equal to or less than ₩10,000, XXXX RP-1XE120
   ₩6,000
   online price tag (b)

ONLINE SHOPPING SUPPORT DEVICE AND METHOD FOR OPERATING ONLINE SHOPPING SUPPORT DEVICE

CROSS-REFERENCE TO RELATED APPLICATION

The instant present application is a continuation of the national phase of PCT/KR2020/013134, filed Sep. 25, 2020, which is based on and claims priorities to Korean Patent Application No. 10-2019-0123754, filed on Oct. 7, 2019. The disclosures of above-listed applications are hereby incorporated by reference herein in their entirety.

TECHNICAL FIELD

The present disclosure relates to a method of supporting purchase of products having competitive prices for a purchaser accessing a webpage of an exhibitor on the basis of online price tags embedded into the webpage of the exhibitor according to a demand of the exhibitor (personal user).

BACKGROUND

With the development of information communication technology, the number of people purchasing products online has explosively increased, and accordingly, the market size of online shopping malls is rapidly expanding.

However, in the case of the conventional online shopping malls, biggest online shopping malls are being developed in an open market platform, and small and medium shopping malls suffer from financial problems and are eliminated, and thus polarization between online shopping malls has become serious.

Particularly, some biggest online shopping malls control the online market in an oligopoly, and people who desire to sell products online open a store on a biggest online shopping mall to sell the products online without directly managing an online shopping mall.

As described above, product sellers thronged toward a few of biggest online shopping malls and thus selling commission required for small sellers by a few of biggest online shopping malls has gradually increased, but the number of biggest online shopping malls is limited and accordingly, sellers open stores on the corresponding shopping malls in spite of excessive selling fees.

Further, the inventor(s) has noted that a customer has no choice but to purchase a product having a fixed selling price arranged by the online shopping malls, and there is a limit in that purchase of a product having a competitive price cannot be actually guaranteed.

Therefore, the present disclosure proposes a new online shopping support method capable of removing the limit of the conventional online shopping environment.

In accordance with some aspects of the present disclosure, the present disclosure provides an apparatus and a method for supporting purchase of a product having a competitive price for a purchaser accessing to a webpage of an exhibitor on the basis of an online price tag embedded into the webpage of the exhibitor according to a demand of the exhibitor (individual).

SUMMARY

In accordance with some embodiments, an apparatus for supporting online shopping comprises an identification unit configured to identify an online price tag of a specific product embedded into a webpage of an exhibitor, an update unit configured to update a selling price exposed to the online price tag according to a result of a reverse auction between sellers for a selling price of the specific product, and a processing unit configured to, when a purchase intent of a purchaser accessing the webpage of the exhibitor is identified from the online price tag, process a procedure of purchasing the specific product based on the updated selling price.

In accordance with some embodiments, the apparatus further comprises a generation unit configured to, when selection for the specific product is identified from a result of a product search performed by the exhibitor, generate an embedding code for embedding the online price tag of the specific product and allow the exhibitor to insert the embedding code into the webpage of the exhibitor.

In accordance with some embodiments, the processing unit is configured to identify a purchase intent of the purchaser from an operation of selecting the online price tag or identify a purchase intent of the purchaser from an operation of scanning for a product code exposed when the online price tag is selected.

In accordance with some embodiments, the processing unit is configured to record product information of the specific product in a personal purchase area that matches the purchaser according to a purchase configuration or immediately process payment for purchase of the specific product.

In accordance with some embodiments, the processing unit is configured to, when there is a desired purchase price configured for the specific product by the purchaser according to a purchase configuration, process a procedure of purchasing the specific product at a time point at which the updated selling price matches the desired purchase price.

In accordance with some embodiments, the apparatus further includes an issue unit configured to, when payment for purchase is completed according to a procedure of purchasing the specific product, issue an exhibition fee which should be paid to the exhibitor as a reward for embedding of the online price tag.

In accordance with some embodiments, a method of operating an online shopping support apparatus comprises an identification step of identifying an online price tag of a specific product embedded into a webpage of an exhibitor, an update step of updating a selling price exposed to the online price tag according to a result of a reverse auction between sellers for a selling price of the specific product, and a processing step of, when a purchase intent of a purchaser accessing the webpage of the exhibitor is identified from the online price tag, processing a procedure of purchasing the specific product based on the updated selling price.

In accordance with some embodiments, the method further comprises a generation step of, before the identification step, when selection for the specific product is identified from a result of a product search performed by the exhibitor, generating an embedding code for embedding the online price tag of the specific product and allowing the exhibitor to insert the embedding code into the webpage of the exhibitor.

In accordance with some embodiments, the processing step comprises identifying a purchase intent of the purchaser from an operation of selecting the online price tag or identifying a purchase intent of the purchaser from an operation of scanning for a product code exposed when the online price tag is selected.

In accordance with some embodiments, the processing step comprises recording product information of the specific product in a personal purchase area that matches the purchaser according to a purchase configuration or immediately processing payment for purchase of the specific product.

In accordance with some embodiments, the processing step comprises, when there is a desired purchase price configured for the specific product by the purchaser according to a purchase configuration, processing a procedure of purchasing the specific product at a time point at which the updated selling price matches the desired purchase price.

In accordance with some embodiments, the method further comprises an issue step of, when payment for purchase is completed according to a procedure of purchasing the specific product, issuing an exhibition fee which should be paid to the exhibitor as a reward for embedding of the online price tag.

Figure 1:
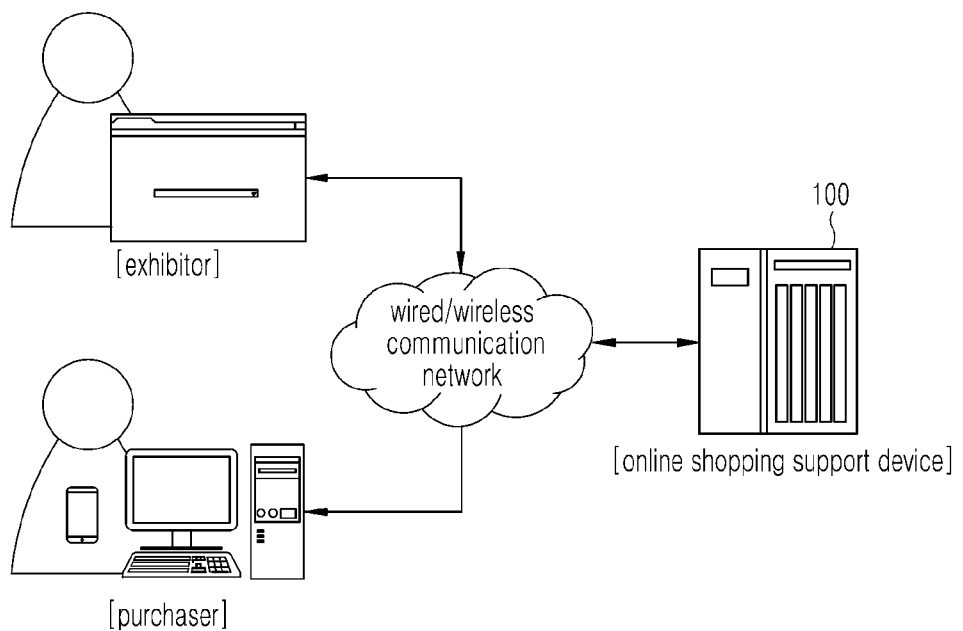
FIG. 1 is an exemplary diagram illustrating an online shopping support service environment according to one or more embodiments of the present disclosure.

The technical terms used in the specification are merely used to describe a specific embodiment and do not intent to limit the idea of the technology disclosed in the specification. Further, the technical terms used in the specification should be construed as a meaning generally understood by those skilled in the art unless the terms are specially defined as another meaning in the specification and should not be construed as an excessively inclusive meaning or an excessively exclusive meaning. When the technical term used in the specification is an incorrect technical term which does not accurately express the idea of the technology disclosed in the specification, the technical term should be replaced with the correct technical term which can be understood by those skilled in the art. Further, the general terms used in the specification should be interpreted in the context according to the dictionary definition and should not be construed as an excessively exclusive meaning.

In addition, a singular expression includes a plural expression as long as they are clearly distinguished in the context. In the specification, the terms "have" or "include" should not be construed as necessarily including all of a plurality of elements or a plurality of steps described in the specification but should be construed as not including some elements or some steps thereof or further including additional elements or steps.

The terms including the ordinal such as "first", "second", or the like used in the specification is used to describe various elements, but the elements should not be limited by the terms. The terms are used merely for the purpose of distinguishing an element from the other element. For example, a first element is named a second element and similarly the second element is named the first element without departing from the scope of the present disclosure.

Hereinafter, embodiments disclosed in the specification are described in detail with reference to the accompanying drawings, but the same reference numeral is assigned to the same or similar elements regardless of the figure number and a duplicated description thereof is omitted.

In the description of the technology disclosed in the specification, when it is determined that a detailed description of relevant known technologies makes the subject of the technology disclosed in the specification unclear, the detailed description is omitted. The accompanying drawings are only for easily understanding of the idea of the technology disclosed in the specification and it should not be construed that the idea of the technology is limited by the accompanying drawings.

Hereinafter, exemplary embodiments of the present disclosure will be described with reference to the accompanying drawings.

FIG. 1 illustrates an online shopping support environment according to one or more embodiments of the present disclosure.

As illustrated in FIG. 1, the online shopping support environment according to one or more embodiments of the present disclosure includes an online shopping support device 100 configured to support online shopping for a purchaser.

The online shopping support device 100 refers to a device configured to support product purchase by a purchaser using online price tags embedded into a webpage of an exhibitor (personal user).

The online shopping support device 100 is implemented, for example, in the form of a server linked to a purchaser terminal (for example, a smartphone or a PC) accessing the webpage of the exhibitor through a wired/wireless communication network or in the form of a program (for example, an application) installed in the purchaser terminal accessing the webpage of the exhibitor.

When the online shopping support device 100 is implemented in the form of a server, the online shopping support device is implemented in the form of, for example, a web server, a database server, or a proxy server, or the like, and is implemented as a computerized system through installation of one or more of various pieces of software that allow a network load distribution mechanism or the service device to operate over the Internet or another network.

In the online shopping support environment according to one or more embodiments of the present disclosure, it is possible to support purchase of products having competitive prices for a purchaser accessing the webpage of the exhibitor on the basis of the above-described configuration.

Meanwhile, as briefly described in the background art, in the conventional online shopping support environment, product sellers concentrate on biggest online shopping malls and thus selling commission required for small sellers by a few of biggest online shopping malls has gradually increased, but the number of biggest online shopping malls is limited and accordingly sellers do not help entering the corresponding shopping malls in spite of excessive selling fees.

Further, a purchaser who purchases products do not help purchasing a product having a fixed selling price arranged by the online shopping malls, and there is a limit in that purchase of a product having a competitive price cannot be actually guaranteed.

Accordingly, the present disclosure proposes a new online shopping support method capable of solving the above limitations of the conventional online shopping environment, and hereinafter the configuration of the online shopping support device 100 for implementing the same is described in more detail.

However, for convenience of description, it is assumed that the online shopping support device 100 according to one or more embodiments of the present disclosure is an element of a server linked to a purchaser terminal (for example, a smartphone or a PC) accessing a webpage of an exhibitor through a wired/wireless communication network.

Figure 2:
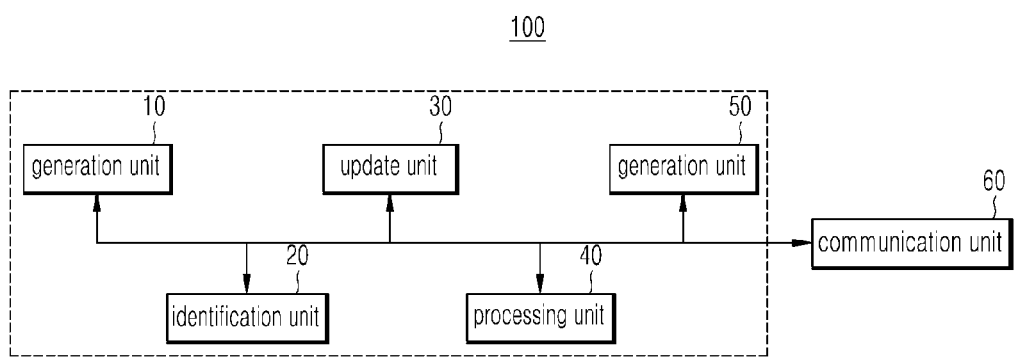
FIG. 2 is an exemplary schematic diagram illustrating an online shopping support device according to one or more embodiments of the present disclosure.

FIG. 2 schematically illustrates the configuration of the online shopping support device 100 according to one or more embodiments of the present disclosure.

As illustrated in FIG. 2, the online shopping support device 100 according to one or more embodiments of the present disclosure includes an identification unit 20 configured to identify an online price tag, an update unit 30 configured to update a selling price, and a processing unit 40 configured to process a purchase procedure. Further, the online shopping support device 100 according to one or more embodiments of the present disclosure further includes a generation unit 10 configured to generate an embedding code for embedding the online price tag and an issue unit 50 for issuing an exhibition fee as well as the above-described elements.

All or at least some of the elements of the online shopping support device 100 is implemented in the form of a hardware module or a software module or is implemented in the form of a combination of the hardware module and the software module.

The software module is understood as, for example, an instruction executed by a processor configured to process calculations within the online shopping support device 100, and the instruction has the form installed in a separate memory within the online shopping support device 100.

Meanwhile, the online shopping support device 100 according to one or more embodiments of the present disclosure further includes a communication unit 60 which is an RF module serving to perform an actual communication function to support online shopping as well as the above-described elements.

The communication unit 60 includes, for example, an antenna system, an RF transceiver, one or more amplifiers, a tuner, one or more oscillators, a digital signal processor, a CODEC chipset, and a memory, but is not limited thereto, and includes all known circuits for performing the function.

The online shopping support device 100 according to one or more embodiments of the present disclosure supports purchase of products having competitive prices for a purchaser accessing a webpage of an exhibitor on the basis of online price tags embedded in to the webpage of the exhibitor according to a demand of the exhibitor (personal user) through the above-described configuration and, hereinafter, each element within the online shopping support device 100 for implementing the same is described in more detail.

The generation unit 10 performs a function of generating an embedding code.

More specifically, when selection of a specific product is identified from the result of a product search performed by the exhibitor, the generation unit 10 generates an embedding code for embedding an online price tag of the selected specific product.

The exhibitor refers to a subscriber who subscribes to an online shopping support service provided the online shopping support device 100 among personal users of webpage (for example, blog, YouTube, email, social media, and the like) and makes a request for generating an online price tag of a product which the exhibitor desires to exhibit through a product search.

Further, when the embedding code of the specific product selected by the exhibitor is generated in the online shopping support device 100 according to the request for generating the online price tag, the exhibitor copies the generated embedding code and insert the same into his/her own webpage having many visitors, so as to embed the online price tag of the specific product into the webpage.

Meanwhile, a procedure of copying and inserting the embedding code, required for embedding of the online price tag is directly performed by the exhibitor according to guide information provided by the generation unit 10 or is performed only a designation of the webpage of the exhibitor according to an automatic procedure by the generation unit 10.

The identification unit 20 performs a function of identifying the online price tag.

More specifically, after the online price tag of the specific product is embedded into the webpage of the exhibitor, the identification unit 20 identifies the online price tag embedded into the webpage of the exhibitor in order to update a selling price of the specific product exposed to the online price tag.

At this time, the identification unit 20 identifies the online price tag embedded into the webpage of the exhibitor by identifying an exhibitor list matching the specific product and address information of the webpage corresponding to the exhibitor list or identifying generation (issue) information of the embedding code generated for the specific product or address information of the matched webpage.

The update unit 30 performs a function of updating the selling price of the specific product.

More specifically, when the online price tag of the specific product embedded into the webpage of the exhibitor is identified, the update unit 30 updates the selling price exposed to the corresponding online price tag.

At this time, the update unit 30 processes a reverse auction for the selling price of the specific product, selects a seller presenting the lowest selling price on the basis of the result of the reverse auction, and newly updates the conventional selling price exposed to the online price tag to the selling price of the selected seller.

Such an update procedure of the selling price is performed in every bid or whenever the result of the reverse auction progressed according to a predetermined period is derived.

Figure 3:
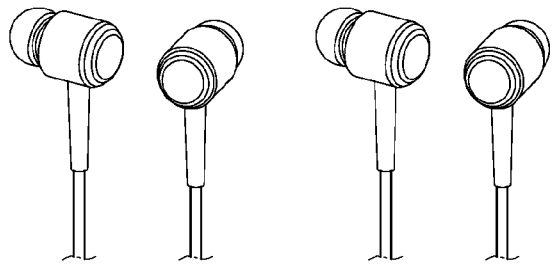
FIG. 3 is an exemplary webpage illustrating an online price tag according to one or more embodiments of the present disclosure.
Figure 3:
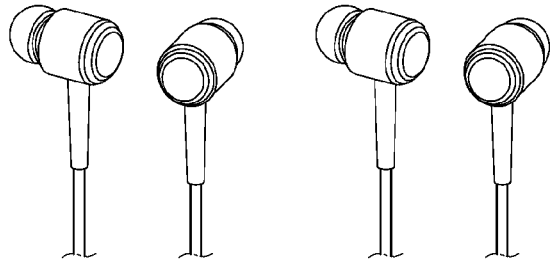

As a result, the selling price of the specific produce is not maintained at a fixed price in the webpage of the exhibitor according to one or more embodiments of the present disclosure as illustrated in FIG. 3(*a*), but the selling price is newly updated to the lowest selling price according to the result of the reverse auction through the online price tag embedded into the webpage as illustrated in FIG. 3(*b*).

The processing unit 40 performs a function of processing a procedure of purchasing the specific product.

More specifically, when a purchase intent of the purchaser accessing the webpage of the exhibitor is identified from the online price tag, the processing unit 40 processes a procedure of purchasing the specific product based on the updated selling price.

At this time, the processing unit 40 identifies the purchase intent on the basis of a selection (click or touch) operation of the purchaser for the online price tag embedded into the webpage of the exhibitor or on the basis of a scan operation of the purchaser for a product code (for example, a QR code) newly exposed by the selection (click or touch) operation of the purchaser for the online price tag embedded in to the webpage of the exhibitor.

Further, when the purchase intent of the purchaser for the specific product is identified, the processing unit 40 records product information of the specific product in, for example, a personal purchase area (for example, a shopping cart) which matches the purchaser according to a purchase configuration and then process payment for purchase of the specific product recorded in the personal purchase area according to a separate request from the purchaser or immediately process payment for purchase of the specific product without the recording operation for the personal purchase area (for example, the shopping cart) which matches the purchaser.

Meanwhile, when there is a desired purchase price configured for the specific product by the purchaser according to the purchase configuration, the processing unit 40 processes a procedure of purchasing the specific product at a time point at which the selling price of the specific product updated according to the result of the reverse auction matches the configured desired purchase price.

At this time, identification of the time point at which the selling price of the specific product updated according to the result of the reverse auction matches the configured desired purchase price can be configured to be valid only for a waiting period during a separately designated period.

The issue unit 50 performs a function of issuing an exhibition fee.

More specifically, when payment for purchase (sale) is completed according to the procedure of purchasing the specific product, the issue unit 50 issues an exhibition fee which should be paid to the exhibitor as a reward for embedding of the online price tag.

At this time, the exhibition fee is issued for a manufacturer of the specific product or an operation entity for providing the online shopping support service according to one or more embodiments of the present disclosure, and the generated exhibition fee is paid to the exhibitor embedding the online price tag into his/her webpage whenever the product is sold through the online price tag.

As described above, according to the configuration of the online shopping support device 100 according to one or more embodiments of the present disclosure, it is possible to support purchase of the product having the competitive price through the reverse auction between sellers for a purchaser accessing the webpage of the exhibitor on the basis of the online price tag embedded into the webpage of the exhibitor according to the demand of the exhibitor (personal user), thereby enhancing service satisfaction of the seller and the purchaser. Further, it is possible to find and expand a market of new products through induction of active service participation of exhibitors by introducing a new service concept that is an exhibitor embedding an online price tag into his/her webpage and paying an exhibition fee to the exhibitor whenever a product is sold using the online price tag.

Figure 4:
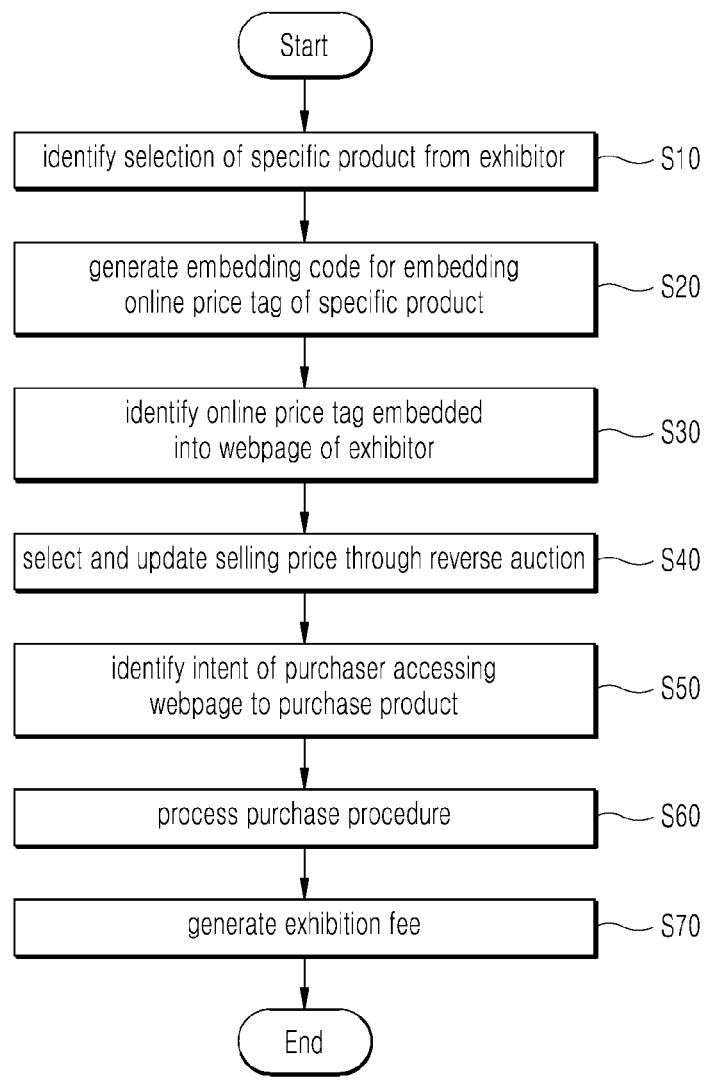
FIG. 4 is an exemplary flowchart illustrating a method of operating an online shopping support device according to one or more embodiments of the present disclosure.

Hereinafter, a method of operating the online shopping support device 100 according to one or more embodiments of the present disclosure is described with reference to FIG. 4.

First, when selection of a specific product is identified from the result of a product search performed by the exhibitor, the generation unit 10 generates an embedding code for embedding an online price tag of the selected specific product in S10 to S20.

The exhibitor refers to a subscriber who subscribes to an online shopping support service provided the online shopping support device 100 among personal users of webpage (for example, blog, YouTube, email, social media, and the like) and makes a request for generating an online price tag of a product which the exhibitor desires to exhibit through a product search.

Further, when the embedding code of the specific product selected by the exhibitor is generated in the online shopping support device 100 according to the request for generating the online price tag, the exhibitor copies the generated embedding code and insert the same into his/her own webpage having many visitors, so as to embed the online price tag of the specific product into the webpage.

Meanwhile, a procedure of copying and inserting the embedding code, required for embedding of the online price tag is directly performed by the exhibitor according to guide information provided by the generation unit 10 or is performed only a designation of the webpage of the exhibitor according to an automatic procedure by the generation unit 10.

After the online price tag of the specific product is embedded into the webpage of the exhibitor, the identification unit 20 identifies the online price tag embedded into the webpage of the exhibitor in order to update the selling price of the specific product exposed to the online price tag in S30.

At this time, the identification unit 20 identifies the online price tag embedded into the webpage of the exhibitor by identifying an exhibitor list matching the specific product and address information of the webpage corresponding to the exhibitor list or identifying generation (issue) information of the embedding code generated for the specific product or address information of the matched webpage.

When the online price tag of the specific product embedded into the webpage of the exhibitor is identified, the update unit 30 updates the selling price exposed to the corresponding online price tag in S40.

At this time, the update unit 30 processes a reverse auction for the selling price of the specific product, selects a seller presenting the lowest selling price on the basis of the result of the reverse auction, and newly updates the conventional selling price exposed to the online price tag to the selling price of the selected seller.

Such an update procedure of the selling price is performed in every bid or whenever the result of the reverse auction progressed according to a predetermined period is derived.

As a result, the selling price of the specific produce is not maintained at a fixed price in the webpage of the exhibitor according to one or more embodiments of the present disclosure as illustrated in FIG. 3A, but the selling price is newly updated to the lowest selling price according to the result of the reverse auction through the online price tag embedded into the webpage as illustrated in FIG. 3B.

When a purchase intent of the purchaser accessing the webpage of the exhibitor is identified from the online price tag, the processing unit 40 processes a procedure of purchasing the specific product based on the updated selling price in S50 to S60.

At this time, the processing unit 40 identifies the purchase intent on the basis of a selection (click or touch) operation of the purchaser for the online price tag embedded into the webpage of the exhibitor or on the basis of a scan operation of the purchaser for a product code (for example, a QR code) newly exposed by the selection (click or touch) operation of the purchaser for the online price tag embedded in to the webpage of the exhibitor.

Further, when the purchase intent of the purchaser for the specific product is identified, the processing unit 40 records product information of the specific product in, for example, a personal purchase area (for example, a shopping cart) which matches the purchaser according to a purchase configuration and then process payment for purchase of the specific product recorded in the personal purchase area according to a separate request from the purchaser or immediately process payment for purchase of the specific product without the recording operation for the personal purchase area (for example, the shopping cart) which matches the purchaser.

Meanwhile, when there is a desired purchase price configured for the specific product by the purchaser according to the purchase configuration, the processing unit 40 processes a procedure of purchasing the specific product at a time point at which the selling price of the specific product updated according to the result of the reverse auction matches the configured desired purchase price.

At this time, identification of the time point at which the selling price of the specific product updated according to the result of the reverse auction matches the configured desired purchase price can be configured to be valid only for a waiting period during a separately designated period.

Thereafter, when payment for purchase (sale) is completed according to the procedure of purchasing the specific product, the issue unit 50 issues an exhibition fee which should be paid to the exhibitor as a reward for embedding of the online price tag in S70.

At this time, the exhibition fee is issued for a manufacturer of the specific product or an operation entity for providing the online shopping support service according to one or more embodiments of the present disclosure, and the generated exhibition fee is paid to the exhibitor embedding the online price tag into his/her webpage whenever the product is sold through the online price tag.

As described above, according to the method of operating the online shopping support device 100 according to one or more embodiments of the present disclosure, it is possible to support purchase of the product having the competitive price through the reverse auction between sellers for a purchaser accessing the webpage of the exhibitor on the basis of the online price tag embedded into the webpage of the exhibitor according to the demand of the exhibitor (personal user), thereby enhancing service satisfaction of the seller and the purchaser. Further, it is possible to find and expand a market of new products through induction of active service participation of exhibitors by introducing a new service concept that is an exhibitor embedding an online price tag into his/her webpage and paying an exhibition fee to the exhibitor whenever a product is sold using the online price tag.

The implementations of the functional operations and subject matter described in the present disclosure is realized by a digital electronic circuit, by the structure described in the present disclosure, and the equivalent including computer software, firmware, or hardware including, or by a combination of one or more thereof. Implementations of the subject matter described in the specification is implemented in one or more computer program products, that is, one or more modules related to a computer program command encoded on a tangible program storage medium to control an operation of a processing system or the execution by the operation.

A computer-readable medium is a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system includes, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) is written in any form of programming language, including compiled or interpreted languages, declarative or procedural languages, and it is deployed in any form, including as a stand-alone program or module, a component, subroutine, or another unit suitable for use in a computer environment. A computer program, but need not, corresponds to a file in a file system. A program is stored in a single file provided to the requested program, in multiple coordinated files (for example, files that store one or more modules, sub-programs, or portions of code), or in a portion of a file that holds other programs or data (for example, one or more scripts stored in a markup language document). A computer program is deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory is added by a special purpose logic circuit or integrated into the logic circuit.

The implementations of the subject matter described in the specification is implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what is claimed, but rather as descriptions of features that is specific to particular embodiments of particular disclosures. Certain features that are described in the specification in the context of separate embodiments also be implemented in combination in a single embodiment. Conversely, various features that are described in the context of a single embodiment also be implemented in multiple embodiments separately or in any suitable subcombination. Moreover, although features is described above as acting in certain combinations and even initially claimed as such, one or more features from a claimed combination may in some cases be excised from the combination, and the claimed combination is directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing is preferable. Furthermore, it should not be understood that a separation of the various system components of the above-mentioned implementation is required in all implementations. In addition, it should be understood that the described program components and systems usually is integrated in a single software package or is packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

The invention claimed is:

1. An apparatus for supporting online shopping, the apparatus comprising:
   a generation unit configured to, in response to a request for an online price tag of a specific product from an exhibitor, generate an embedding code for embedding the online price tag of the specific product and allow the online price tag of the specific product to be embedded into a webpage of the exhibitor based on the embedding code, wherein the online price tag includes a selling price of the specific product exposed thereto, identification information (ID) of the specific product, and ID of the exhibitor;
   an update unit configured to update the selling price exposed to the online price tag according to a result of a reverse auction between sellers for a selling price of the specific product; and
   a processing unit configured to, in response to identifying a purchase intent of a purchaser accessing the webpage of the exhibitor from selecting of the online price tag embedded in the webpage of the exhibitor, process a procedure of purchasing the specific product based on the updated selling price.

2. The apparatus of claim 1, wherein the processing unit is configured to identify a purchase intent of the purchaser from an operation of selecting the online price tag or identify a purchase intent of the purchaser from an operation of scanning for a product code exposed when the online price tag is selected.

3. The apparatus of claim 1, wherein the processing unit is configured to record product information of the specific product in a personal purchase area that matches the purchaser according to a purchase configuration or immediately process payment for purchase of the specific product.

4. The apparatus of claim 1, wherein the processing unit is configured to, when there is a desired purchase price configured for the specific product by the purchaser according to a purchase configuration, process a procedure of purchasing the specific product at a time point at which the updated selling price matches the desired purchase price.

5. The apparatus of claim 1, further comprising an issue unit configured to, when payment for purchase is completed according to a procedure of purchasing the specific product, issue an exhibition fee which should be paid to the exhibitor as a reward for embedding of the online price tag.

6. The apparatus of claim 1, wherein the online price tag is embedded by copying and inserting the embedding code into the webpage of the exhibitor by the exhibitor.

7. The apparatus of claim 1, wherein the online price tag is embedded by copying and inserting the embedding code into the webpage of the exhibitor by the generation unit.

8. A method of operating an online shopping support apparatus, the method comprising:
   a generating step of, in response to a request for an online price tag of a specific product from an exhibitor, generating an embedding code for embedding the online price tag of the specific product and allowing the online price tag of the specific product to be embedded into a webpage of the exhibitor based on the embedding code, wherein the online price tag includes a selling price of the specific product exposed thereto, identification information (ID) of the specific product, and ID of the exhibitor;
   an update step of updating a selling price exposed to the online price tag according to a result of a reverse auction between sellers for a selling price of the specific product; and
   a processing step of, in response to identifying a purchase intent of a purchaser accessing the webpage of the exhibitor from selecting of the online price tag embedded in the webpage of the exhibitor, processing a procedure of purchasing the specific product based on the updated selling price.

9. The method of claim 8, wherein the online price tag is embedded by copying and inserting the embedding code into the webpage of the exhibitor by the exhibitor.

10. The method of claim 8, wherein the processing step comprises identifying a purchase intent of the purchaser from an operation of selecting the online price tag or identifying a purchase intent of the purchaser from an operation of scanning for a product code exposed when the online price tag is selected.

11. The method of claim 8, wherein the processing step comprises recording product information of the specific product in a personal purchase area that matches the purchaser according to a purchase configuration or immediately processing payment for purchase of the specific product.

12. The method of claim 8, wherein the processing step comprises, when there is a desired purchase price configured for the specific product by the purchaser according to a purchase configuration, processing a procedure of purchasing the specific product at a time point at which the updated selling price matches the desired purchase price.

13. The method of claim 8, further comprising an issue step of, when payment for purchase is completed according to a procedure of purchasing the specific product, issuing an exhibition fee which should be paid to the exhibitor as a reward for embedding of the online price tag.

14. The method of claim 8, wherein the online price tag is embedded by copying and inserting the embedding code into the webpage of the exhibitor by the generation unit.

* * * * *